United States Patent [19]
Roberts

[11] Patent Number: 5,765,132
[45] Date of Patent: Jun. 9, 1998

[54] BUILDING SPEECH MODELS FOR NEW WORDS IN A MULTI-WORD UTTERANCE

[75] Inventor: Jed M. Roberts, Newton, Mass.

[73] Assignee: Dragon Systems, Inc., Newton, Mass.

[21] Appl. No.: 548,409

[22] Filed: Oct. 26, 1995

[51] Int. Cl.$^6$ .................................................. G10L 5/06
[52] U.S. Cl. .................. 704/254; 704/243; 704/253; 704/270
[58] Field of Search .................. 395/2.62, 2.63, 395/2.64; 704/243, 253, 254, 270

[56] References Cited

U.S. PATENT DOCUMENTS

| | | | |
|---|---|---|---|
| 4,665,548 | 5/1987 | Kahn | 704/237 |
| 4,688,195 | 8/1987 | Thompson et al. | 395/12 |
| 4,776,016 | 10/1988 | Hansen | 704/275 |
| 4,783,803 | 11/1988 | Baker et al. | 704/252 |
| 4,803,729 | 2/1989 | Baker | 704/241 |
| 4,805,218 | 2/1989 | Bamburg et al. | 704/241 |
| 4,805,219 | 2/1989 | Baker | 704/241 |
| 4,827,520 | 5/1989 | Zeinstra | 704/275 |
| 4,829,576 | 5/1989 | Porter | 704/235 |
| 4,837,831 | 6/1989 | Gillick et al. | 704/245 |
| 4,866,778 | 9/1989 | Baker | 704/254 |
| 4,903,305 | 2/1990 | Gillick et al. | 704/245 |
| 4,914,703 | 4/1990 | Gillick | 704/245 |
| 4,931,950 | 6/1990 | Isle et al. | 395/11 |
| 4,962,535 | 10/1990 | Kimura et al. | 704/252 |
| 4,984,177 | 1/1991 | Rondel et al. | 704/277 |
| 5,027,406 | 6/1991 | Roberts et al. | 704/244 |
| 5,036,538 | 7/1991 | Oken et al. | 704/233 |
| 5,086,472 | 2/1992 | Yoshida | 704/255 |
| 5,095,508 | 3/1992 | Fujimoto | 704/247 |
| 5,127,055 | 6/1992 | Larkey | 704/244 |
| 5,170,432 | 12/1992 | Hackbarth et al. | 704/254 |
| 5,202,952 | 4/1993 | Gillick et al. | 704/200 |
| 5,231,670 | 7/1993 | Goldhor et al. | 704/275 |

OTHER PUBLICATIONS

U.S. Patent Application 08/382,752, "Apparatuses and Methods for Training and Operating Speech Recognition Systems" Joel M. Gould et al., filed Feb. 1, 1995.

U.S. Patent Application, "Speech Recognition," Serial No. 08/521,543, Gregory J. Gadbois, filed Aug. 30, 1995.

U.S. Patent Application, "Speech Recognition," Serial No. 08/559,190, Gregory J. Gadbois, filed Nov. 13, 1995.

U.S. Patent Application "Continuous Speech Recognition of Text and Commands," Serial No. 08/559,207, Joel M. Gould et al., filed Nov. 13, 1995.

Dale Evans, "Talking to the Bug," Microcad News, pp. 58–61, Mar. 1989.

*Primary Examiner*—David R. Hudspeth
*Assistant Examiner*—Tálivaldis Ivars Šmits
*Attorney, Agent, or Firm*—Fish & Richardson PC

[57] ABSTRACT

Words are added to a speech recognition system vocabulary during user dictation by (a) extracting, from a multi-word user utterance, speech frames that correspond to each one of the one or more new words; and (b) building speech models for the one or more new words using the extracted speech frames.

13 Claims, 7 Drawing Sheets

BUILDING SPEECH MODELS FOR NEW WORDS IN A MULTI-WORD UTTERANCE

BACKGROUND

This invention relates to extracting speech frames from a multi-word utterance.

Discrete word recognition systems require users to pause between spoken words (including predetermined phrases, i.e., groups of words treated as a single word). As a result, each user utterance (i.e., speech between two pauses) includes only one recognizable word.

Often, a discrete recognition system allows users to add new words to the recognition system's vocabulary. When a user speaks a new word, because the new word is not in the recognition system's vocabulary, the system recognizes the speech incorrectly as a word most closely matching the speech. The user changes the spelling of the word that the system recognized to match the spelling of the new word, and the system uses the discrete utterance of the new word to generate a speech model for the new word. For example, if the recognition system vocabulary does not include the word "cow" and the user says "cow", then the system recognizes the speech as another word that is available in the system vocabulary, for example, "how". The user then changes the spelling of "how" by changing the "h" to "c", and the recognition system uses the discrete utterance of "cow" to build a speech model for the new word "cow".

For a detailed description of how to build a speech model from a discrete utterance, see U.S. Pat. No. 4,914,703, entitled "Method for Deriving Acoustic Models for Use in Speech Recognition", U.S. Pat. No. 4,903,305, entitled "Method for Representing Word Models for Use in Speech Recognition", and U.S. patent application Ser. No. 08/376,348, entitled "Apparatus and Methods for Developing and Using Models for Speech Recognition", which are incorporated by reference. Additionally, much of what is described above is implemented in the existing product DragonDictate™ from Dragon Systems, Inc. of West Newton, Mass.

SUMMARY

In general, the invention features adding speech elements to a speech recognition system vocabulary by the steps of (a) extracting, from a user utterance, speech frames that correspond to one or more new speech elements; and (b) building speech models for the one or more new speech elements using the extracted speech frames.

Implementations of the invention may include one or more of the following features. The speech models may be saved in the speech recognition system vocabulary. Before extracting the speech frames, a correct spelling of the one or more new speech elements may be provided and saved along with the speech models. Before extracting the speech frames, it may be determined whether a user utterance contains one or more new speech elements. The extracting may be an iterative process including:aligning speech frames of the user utterance against speech elements of the user utterance; building new speech models for the one or more new speech elements in accordance with the alignment; realigning the speech frames of the user utterance against the speech elements using the new speech models; comparing the re-alignment to the alignment; and if the re-alignment and the alignment are not the same, repeating the building step, in accordance with the re-alignment, and the re-aligning and comparing steps until the re-alignment and the previous alignment are the same or until the building step has been repeated a predetermined number of times.

The aligning step may include prompting the user for discrete utterances of the one or more new speech elements; building new speech models for the one or more new speech elements using the discrete utterances; and aligning the speech frames of the user utterance against the speech elements of the user utterance using the new speech models. The aligning step may include determining syllable approximations, and assigning the syllable approximations to speech elements in proportion to a length of each speech element, where the length of each speech element may be the number of letters in the speech element, or the number of vowels in the speech element.

Determining the syllable approximations may be done by determining syllable boundaries including the following steps:detecting a first speech boundary speech frame in the user utterance, the first speech boundary speech frame having an amplitude that exceeds a speech trigger; detecting a first silence boundary speech frame as the first speech frame, prior to the first speech boundary speech frame, to have an amplitude that exceeds a silence trigger, wherein the first silence boundary speech frame comprises a first syllable boundary; detecting a second silence boundary speech frame as the first speech frame, after the first speech boundary speech frame, to have an amplitude that falls below the silence trigger; and detecting local minima between the first and second silence boundary speech frames, wherein the local minima and second silence boundary speech frames comprise next syllable boundaries. The steps may be repeated until each speech frame in the user utterance has been considered. It may also be determined whether the number of syllable approximations is less than the number of speech elements in the user utterance; and, if so, a syllable approximation corresponding to a largest number of speech frames may be divided into multiple syllable approximations. These latter steps may be repeated until the number of syllable approximations is greater than or equal to the number of speech elements in the user utterance.

The advantages of the invention may include one or more of the following.

A speech recognition system that permits a user utterance to include multiple words may build speech models for one or more new words within an utterance. The speech models closely approximate how the new words actually sound when spoken together with other words (i.e., natural speech). The speech recognition system may build speech models for new words without requiring the user to discretely speak the new word such that the addition of a new word to the system vocabulary appears as a simple correction of a mis-recognized word.

Other advantages and features will become apparent from the following description and from the claims.

When a person speaks naturally (i.e., continuous speech), each user utterance (speech between successive pauses) may include multiple words and the words typically run together causing "co-articulation." Co-articulation results when the sound of a word currently being spoken is affected by the sound of a word spoken just prior to the current word. Co-articulation increases the difficulty in recognizing continuous speech. The pauses required by discrete word recognition systems substantially prevent coarticulation. A user's speech is termed "connected speech" when the user speaks each word or phrase clearly with little or no co-articulation but does not pause between the words or phrases. In connected speech, each user utterance may again include multiple words.

A modified discrete word recognition system also allows multiple words to be spoken within a single user utterance. The degree of co-articulation depends upon whether the words of the utterance are spoken continuously or connectedly. For more a detailed description of a modified discrete word recognition system, see U.S. Ser. No. 08/547,716, filed the same day as this application, and entitled, "Modified Discrete Word Recognition", which is incorporated by reference.

To build a speech model for a new word in a continuous, connected, or modified discrete word speech recognition system, the speech frames corresponding to the new word are extracted from a continuous or connected user utterance. Because discrete speech substantially prevents co-articulation, a speech model built from speech frames within a discrete utterance generally does not closely approximate the way a user naturally (i.e., continuously or connectedly) speaks the word. Building a speech model from speech frames extracted from a continuous or connected utterance provides a speech model that includes some degree of co-articulation and more closely approximates the way a user naturally speaks the new word.

Figure 1:
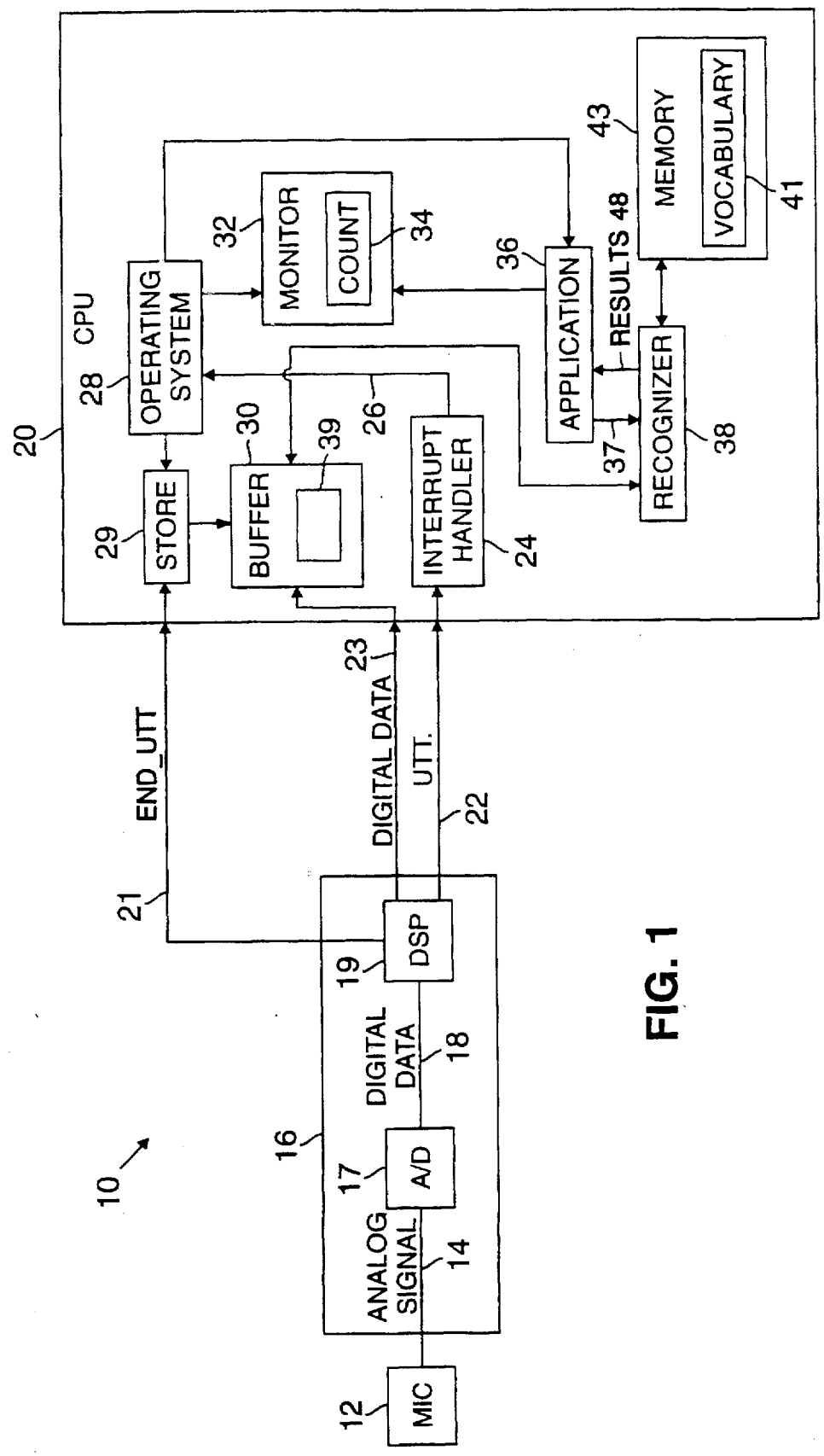
FIG. 1 is a block diagram of a speech recognition system.

Referring to FIG. 1, a typical speech recognition system 10 includes a microphone 12 for converting a user's speech into an analog data signal 14 and a sound card 16. Sound card 16 generally includes a digital signal processor (DSP) 17 and an analog-to-digital (A/D) converter 19. A/D converter 19 converts the analog data signal into a digital data signal 18 by sampling the analog data signal at about 11 Khz to generate 220 digital samples during a 20 msec time period. Each 20 ms time period corresponds to a separate speech frame. The DSP processes the samples corresponding to each speech frame to generate a group of parameters associated with the analog data signal during the 20 ms period. Generally, the parameters represent the amplitude of the speech at each of a set of frequency bands.

The DSP also monitors the volume of the speech frames to detect user utterances. If the volume of three consecutive speech frames within a window of five consecutive speech frames (i.e., three of the last five speech frames) exceeds a predetermined speech threshold, for example, 20 dB, then the DSP determines that the analog signal represents speech and the DSP begins sending several, e.g., three, speech frames of data at a time (i.e., a batch) via a digital data signal 23 to a central processing unit (CPU) 20. The DSP asserts an utterance signal (Utt) 22 to notify the CPU each time a batch of speech frames representing an utterance is sent via the digital data signal.

When an interrupt handler 24 on the CPU receives assertions of Utt signal 22, the CPU's normal sequence of execution is interrupted. Interrupt signal 26 causes operating system software 28 to call a store routine 29. Store routine 29 stores the incoming batch of speech frames into a buffer 30. When fourteen consecutive speech frames within a window of nineteen consecutive speech frames fall below a predetermined silence threshold, e.g., 6 dB, then the DSP stops sending speech frames to the CPU and asserts an End_Utt signal 21. The End_Utt signal causes the store routine to organize the batches of previously stored speech frames into a speech packet 39 corresponding to the user utterance.

Interrupt signal 26 also causes the operating system software to call monitor software 32. Monitor software 32 keeps a count 34 of the number of speech packets stored but not yet processed. An application 36, for example, a word processor, being executed by the CPU periodically checks for user input by examining the monitor software's count. If the count is zero, then there is no user input. If the count is not zero, then the application calls speech recognizer software 38 and passes a pointer 37 to the address location of the speech packet in buffer 30. The speech recognizer may be called directly by the application or may be called on behalf of the application by a separate program, such as Dragon-Dictate™ from Dragon Systems™ of West Newton, Mass., in response to the application's request for input from the mouse or keyboard.

For a more detailed description of how user utterances are received and stored within a speech recognition system, see U.S. Pat. No. 5,027,406, entitled "method for Interactive Speech Recognition and Training", and incorporated by reference.

Figure 2:
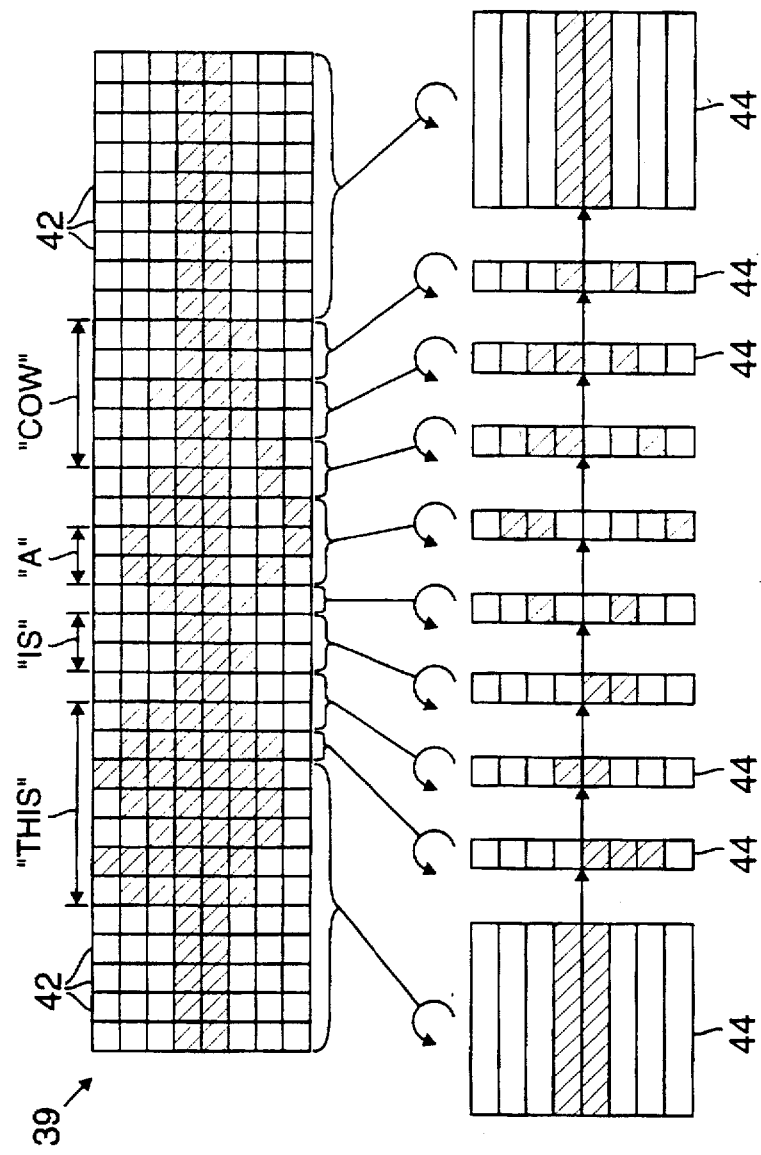
FIG. 2 is a schematic diagram of a speech packet and speech models.

Referring to FIG. 2, when called, the speech recognizer retrieves a speech packet 39 or a portion of the speech packet (i.e., recognition may start before the entire speech packet is stored) from buffer 30. Speech packet 39 represents the utterance "This is a cow." The speech recognizer then compares speech frames 42 to speech models 44 to determine the likelihood that particular speech frames correspond to particular speech models 44.

The speech models for continuous recognition are grouped in a vocabulary 41 (FIG. 1) stored in memory 43. For a more detailed description of vocabulary 41, see U.S. Ser. No. 08/548,408, filed the same day as this application, entitled, "Structured Continuous Speech Recognition", and incorporated by reference. Each speech model in the vocabulary is a multidimensional probability distribution, each dimension of which represents the probability distribution for the values of a given speech frame parameter if its associated speech frame belongs to the class of sounds represented by the speech model.

Figure 3:
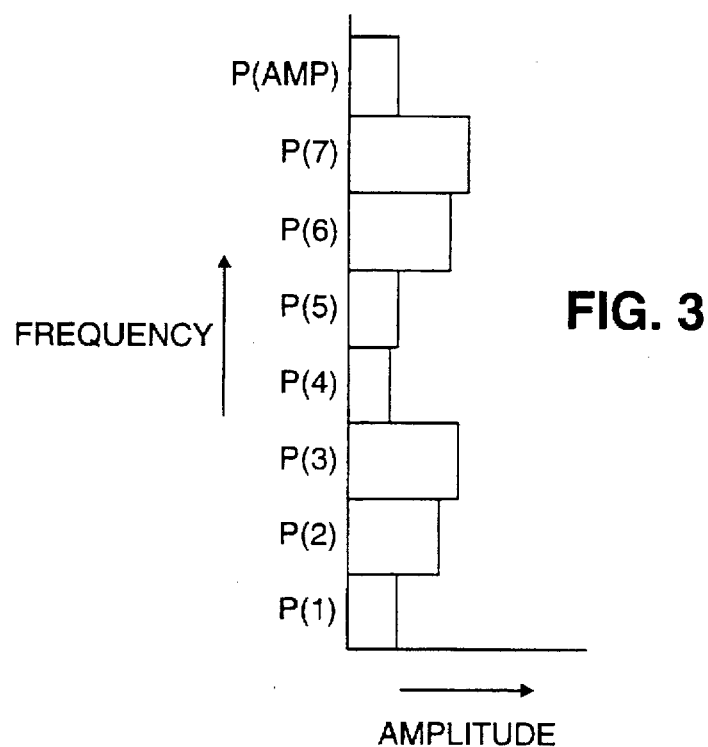
FIG. 3 is a schematic diagram of a portion of a speech frame's parameters.
Figure 4:
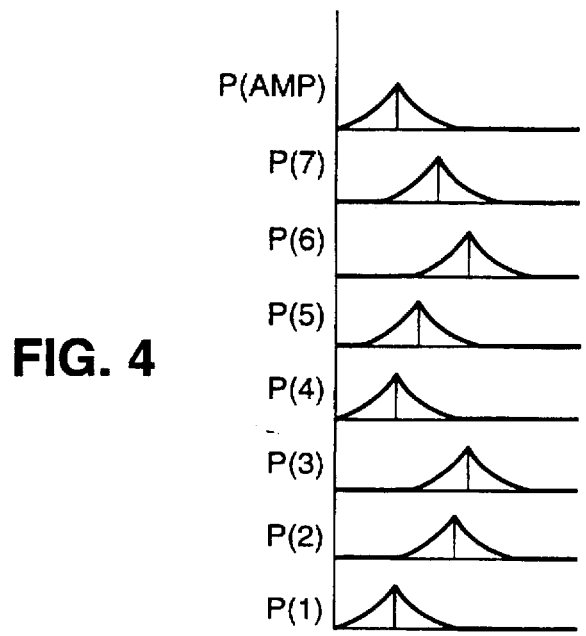
FIG. 4 is a schematic diagram of a portion of a speech model's dimensions.

Referring to FIG. 3, each speech frame includes several, e.g., sixteen, parameter values $P(1)$-$P(15)$ (only $P(1)$-$P(7)$ are shown) and $P(AMP)$ representing the analog signal's energy at each of sixteen frequency bands during the 20 ms associated with each frame. $P(AMP)$ represents the total energy contained in all sixteen frequency bands, while $P(1)$-$P(15)$ represent the energy in the fifteen lowest frequency bands. Referring to FIG. 4, each speech model is a sixteen dimensional probability distribution, having a separate dimension (only eight are shown) corresponding to each of the parameters of the speech frames.

Typically, a speech frame does not exactly match one speech model. As a result, the recognizer keeps a list of words (e.g., "This", "That", "Those", "Therapy" . . . ) or combination of words (e.g., "This is", "That is", "This issue" . . . ) represented by one or more speech models that at least partially match one or more of the speech frames (e.g., "Th"). The recognizer ranks the word list according to how closely the speech models corresponding to each word or combination of words match the speech frames, with the word or combination of words corresponding to the closest matched speech model or models being first in the list and termed the "best candidate." When the recognizer has analyzed each speech frame in the speech packet (i.e., the entire utterance), the best candidate is "recognized" as the word or combination of words spoken by the user.

Figure 5:
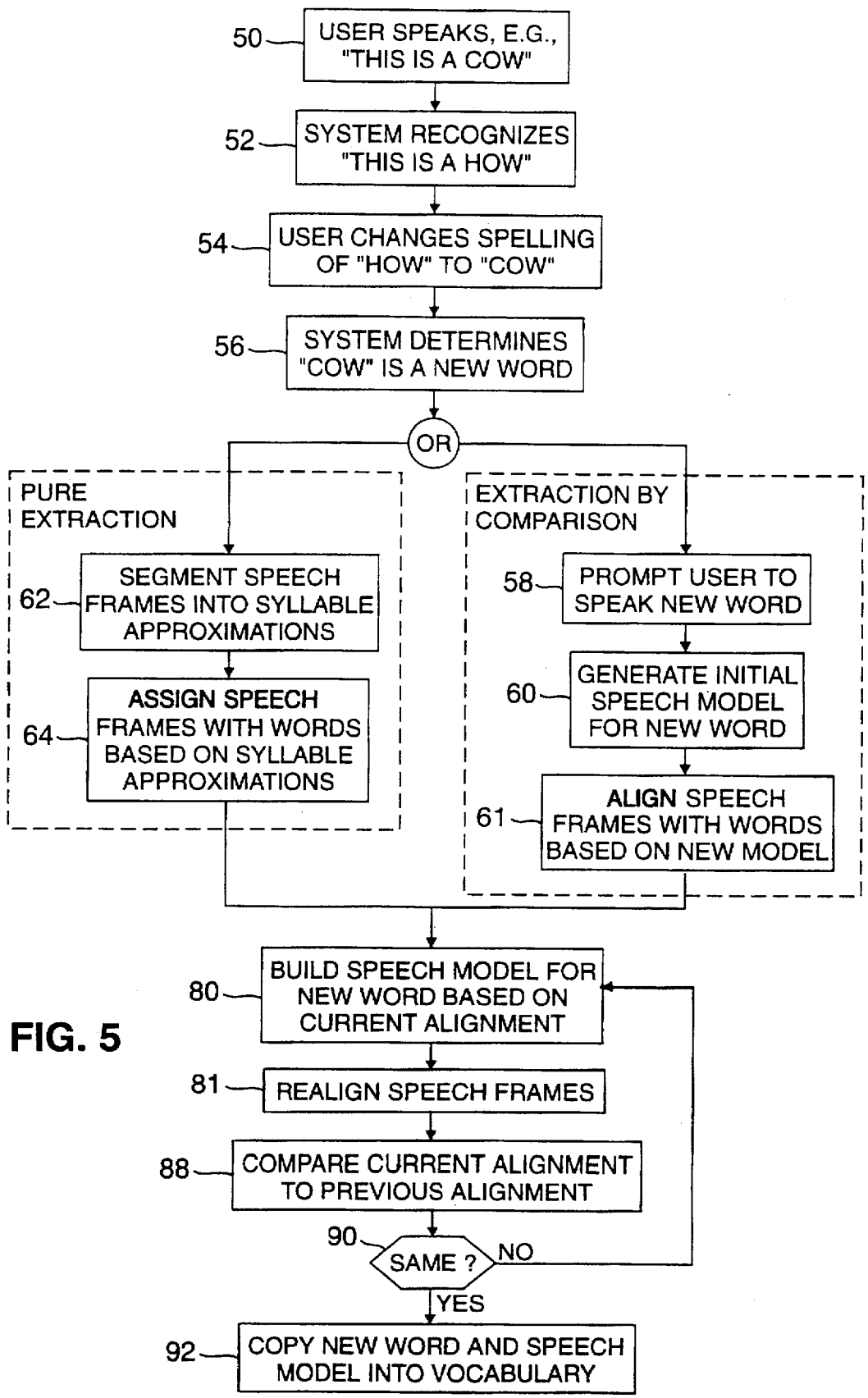
FIG. 5 is a flow chart representing the steps for adding a new word to a speech recognition system vocabulary.

Referring to FIG. 5, to add a new word to vocabulary 41 (FIG. 1), the user speaks an utterance, e.g., "This is a cow," including the new word (step 50), e.g., "cow". Because vocabulary 41 does not include the new word "cow", the best candidate cannot be "This is a cow." Instead, the speech recognition system recognizes (step 52) the best candidate as a combination of words corresponding to speech models that most closely match the speech frames, for example, "This is a how." Through key strokes on a key board, the user then changes (step 54) the spelling of "how" to "cow". After searching vocabulary 41 (FIG. 1), the speech recognition system determines (step 56) that "cow" is a new word.

The speech recognition system then attempts to isolate the speech frames corresponding to the new word so that the speech frames may be extracted and used to build a speech model for the new word. There are many methods for isolating the speech frames corresponding to the new word. For example, one method compares the speech models for the pre-existing words, e.g., "This", "is", and "a", to the utterance and determines that the remaining speech frames correspond to the new word. However, because there is no information on how the new word sounds, this method provides a very rough initial isolation. For example, if the new word is "cow" and the user says "This is a black cow", all of the speech frames representing the "ck" sound at the end of "black" and the "c" sound at the beginning of "cow" are aligned with the speech model for black, and the initial speech model for "cow" includes only the speech frames associated with the sound "ow".

Improved methods to initially isolate the speech frames corresponding to the new word include "Pure Extraction" or "Extraction by Comparison." In Extraction by Comparison, the user is prompted (step 58) to discretely speak the new word. The speech recognition system then generates (step 60) an initial speech model for the new word using the speech frames of the discrete utterance and aligns (step 61) the speech frames of the utterance with the speech models corresponding to the words of the utterance using dynamic programming. In Pure Extraction, the speech recognition system segments (step 62) the speech frames of the entire utterance into syllable approximations and aligns (step 64) the speech frames with the words in the utterance in accordance with the syllable approximations using dynamic programming.

Figure 6:
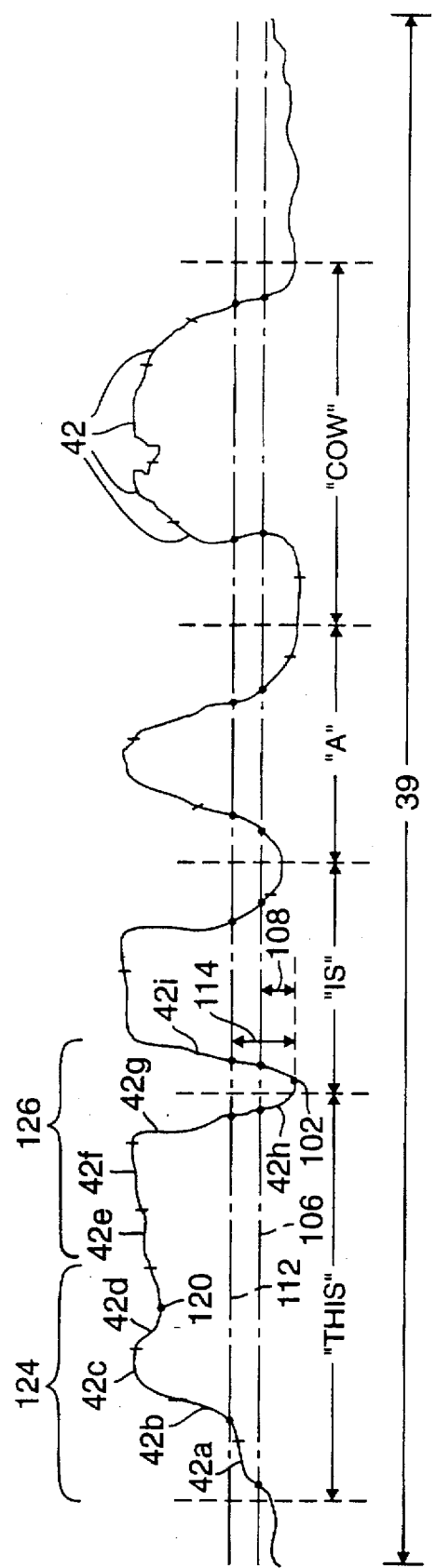
FIG. 6 is a schematic diagram of the P(AMP) parameter of each speech frame in a speech packet.
Figure 7:
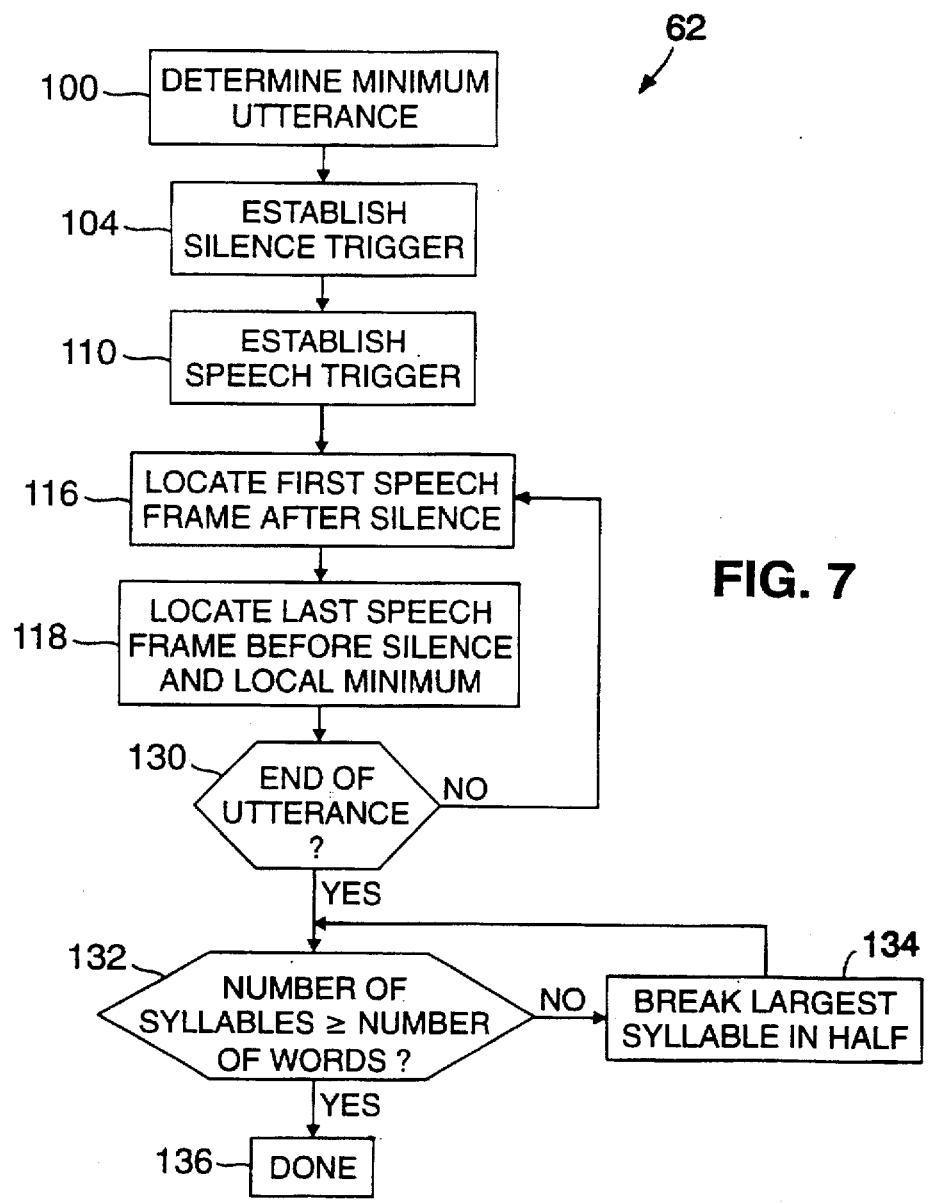
FIG. 7 is a more detailed flow chart of the segment speech frames into syllable approximations step of FIG. 5.

Referring to FIGS. 6 and 7, to segment the speech frames of the utterance into syllable approximations for Pure Extraction, the speech recognition system begins by determining (step 100) the minimum amplitude 102 within speech packet 39 (shown as an analog representation of the P(AMP) parameter of each speech frame 42). The speech recognition system then establishes (step 104) a silence trigger (dashed line 106) by adding a silence offset 108, e.g., 4.5 dB, to minimum amplitude 102. The speech recognition system also establishes (step 110) a speech trigger (dashed line 112) by adding a speech offset 114, e.g., 12 dB, to the minimum amplitude.

The speech recognition system then locates (step 116) the first speech frame after silence (in this example, the first speech frame of the first syllable). The speech recognition system locates the first speech frame to exceed the speech trigger, e.g., speech frame 42b. The speech recognition system then determines whether earlier consecutive speech frames exceeded the silence trigger and determines the first one of these earlier consecutive speech frames to exceed the silence trigger as the first speech frame after silence, e.g., speech frame 42a. The speech recognition system then locates (step 118) the next speech frame 42h whose amplitude does not exceed the silence trigger and the speech frames, e.g., speech frame 42d, between speech frames 42a and 42h, that have local minimum amplitudes, e.g., 120. Local minimum amplitude 120 and speech frame 42h establish approximate syllable boundaries. For example, the first syllable 124 is estimated as including speech frames 42a, 42b, 42c, and 42d, the second syllable 126 is estimated as including speech frames 42e, 42f, and 42g.

The speech frames whose amplitudes do not exceed the silence triggers may be used as approximate word boundaries. However, this provides a very rough approximation because many words include internal silences. For example, the words "speaks" and "seeks" include internal silences between the "k" sound and the following "s" sound.

The speech recognition system then determines (step 130) whether the end of the utterance has been reached (i.e., all speech frames in speech packet 39 have been considered). If all the speech frames have not been considered, then the speech recognition system repeats steps 116, 118, and 130 until all of the speech frames have been considered. When step 116 is re-executed, the speech recognition system determines that speech frame 42i is the first speech frame to exceed the speech trigger after silence. Speech frame 42i is also determined to be the first speech frame to exceed the silence trigger after silence. As a result, the next syllable, e.g., syllable three, starts with speech frame 42i.

When all of the speech frames have been considered, the speech recognition system determines (step 132) whether the number of syllable approximations is greater than or equal to the number of words in the utterance. There must be at least one syllable for each word in the utterance. If the number of syllable approximations is less than the number of words, then the speech recognition system breaks (step 134) the largest syllable approximation (i.e., the syllable approximation with the largest number of speech frames) in half by dividing the number of speech frames between two new syllables.

If the number of syllables is greater than or equal to the number of words, then the speech recognition system is done (step 136) with syllable approximation. The speech recognition system then assigns (step 64, FIG. 5) the speech frames to the words in the utterance in accordance with the syllable approximations using dynamic programming. The assignment provides an initial alignment. The total number of speech frames assigned to each word is approximately proportional to the number of letters in each word. For example, the total number of letters in the utterance "This is a cow" is ten. As a result, "This" having four letters is assigned syllables such that it receives approximately forty percent of the number of speech frames, "cow" is assigned syllables such that it receives approximately thirty percent of the number of speech frames, "is" is assigned syllables such that it receives approximately twenty percent of the number of speech frames, and "a" is assigned syllables such that it receives approximately ten percent of the number of speech frames. In any event, each word is assigned at least one syllable.

Alternatively, the number of syllables (and, hence, the number of speech frames) is proportioned among the words of an utterance in accordance with the number of vowels in each word or in accordance with a combination of the number of letters and vowels in each word. Vowels generally take longer to say which corresponds to a larger number of speech frames.

Figure 8:
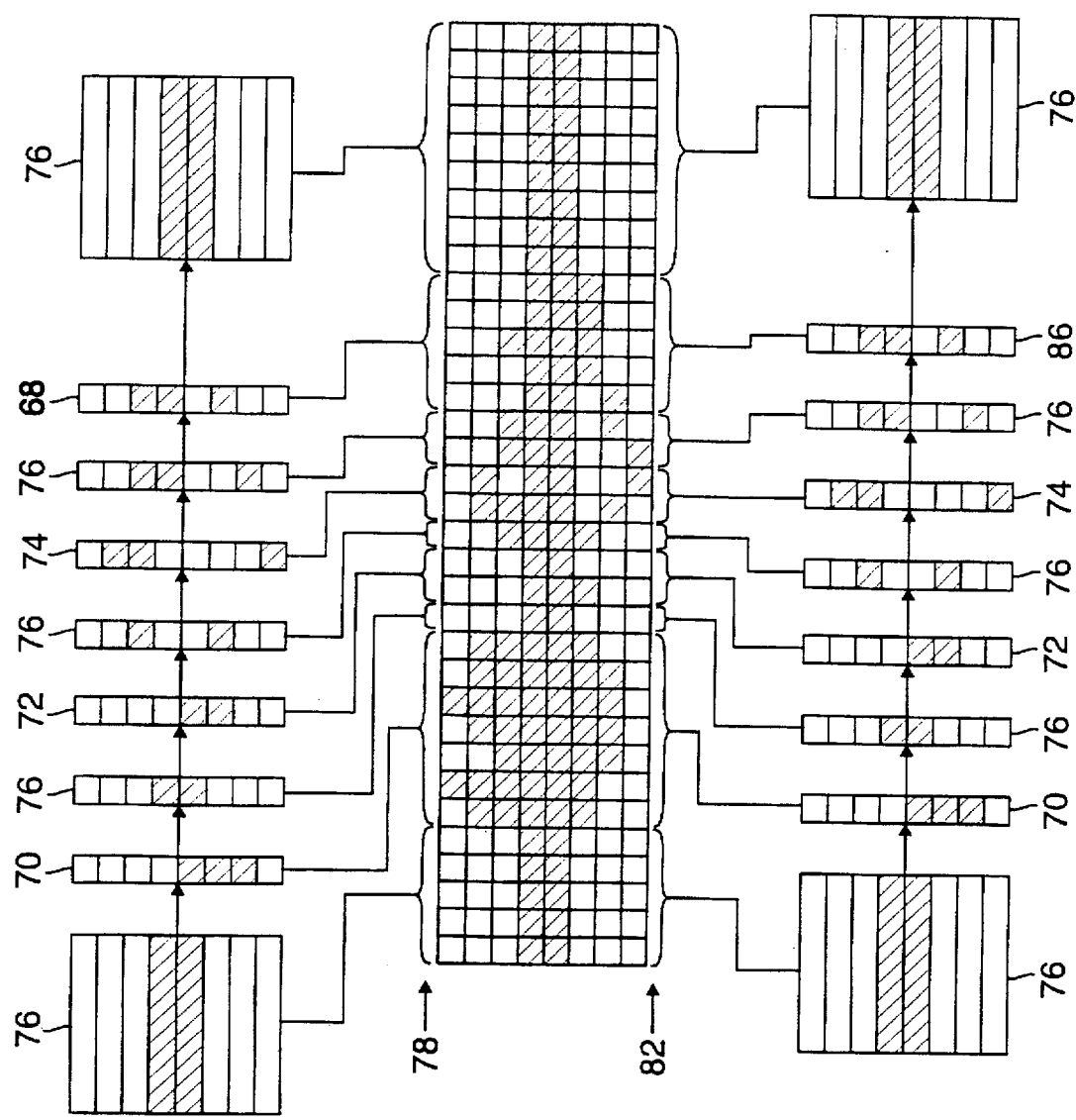
FIG. 8 is a schematic diagram of a speech packet's speech frames being aligned with speech models through dynamic programming.

Referring to FIG. 8, dynamic programming (steps 61 and 64, FIG. 5) provides an initial alignment 78 using speech models or syllable approximations, for example, new word, e.g., "cow", speech model or syllable approximation 68, pre-existing word, e.g., "This", "is", "a", speech models or syllable approximations 70, 72, 74, respectively, and silence speech models or syllable approximations 76.

Referring to again to FIG. 5, after providing an initial alignment, the speech recognition system, for both methods (Pure Extraction and Extraction by Comparison), builds (step 80) a speech model (86, FIG. 8) for the new word based on a current alignment (in this case, the initial alignment). The speech recognizer uses dynamic programming to re-align (step 81) the speech frames of the user utterance against the speech models (70, 72, 74, 76, and 86, FIG. 8) to provide a new alignment 82 (FIG. 8). The new alignment reduces the differences between the sixteen parameters (P(1)-P(15) and P(AMP), FIG. 3) of each speech frame and the sixteen dimensional probability distribution (FIG. 4) of each speech model. For a detailed description of dynamic programming, see *Algorithms*, by Leiserson, et al., published by the MIT Press, and incorporated by reference.

The speech recognition system then compares (step 88) the current alignment (e.g., new alignment 82) to the previous alignment (e.g., initial alignment 78). If the speech recognition system determines (step 90) that the current alignment is not the same as the previous alignment, then the speech recognizer returns to step 80 and builds a new speech model for the new word based on the current alignment (new alignment 82). Steps 80, 81, and 88 are repeated a maximum number of, e.g., 6, times or until the current and previous alignments are determined (step 90) to be the same. A maximum number of iterations is set to prevent the speech recognition system from entering an endless loop where one speech frame is passed back and forth between two speech models. This iterative process provides an accurate speech model for the new word by determining an alignment of the speech frames against the speech models that minimizes the differences between the speech frame parameters and the speech model dimensions.

Once the speech recognition system determines that the next and previous alignments are the same or that steps 80, 81, and 88 have been repeated the maximum number of times, the speech recognition system copies (step 92) the spelling of the new word and the speech model corresponding to the new word into vocabulary 41 (FIG. 1).

Extracting speech frames from a continuous or connected utterance provides a speech model that closely approximates the user's natural speech. Where Pure Extraction is used, the addition of a new word to the vocabulary appears as a simple word mis-recognition because the user is not prompted to speak the new word discretely.

Other embodiments are within the scope of the following claims.

For example, two or more new words may be spoken in one utterance. If multiple new words are not spoken consecutively (i.e., pre-existing words are spoken between new words), then the above described processes are used to generate separate speech models for each new word. If multiple new words are spoken consecutively, the above described process may be used to provide a speech model for a phrase including all new words spoken consecutively or to provide a separate new speech model for each new word.

Once new words and corresponding speech models are copied into vocabulary 41 (FIG. 1), the speech models are further trained (i.e., improved) every time the user speaks the new words. For a more detailed description of how speech models are trained, see U.S. Pat. No. 5,027,406, entitled "Method for Interactive Speech Recognition and Training".

As another example, instead of having a digital signal processor (DSP) process the samples corresponding to each speech frame to generate a group of parameters associated with the analog data signal during each 20 ms time period, the CPU includes front-end processing software that allows the CPU to generate the parameters.

Following is pseudo-code derived from C Programming Language Code that describes the process for extracting speech frames for a multi-word utterance:

```
// This routine finds syllables in an utterance.  The
// algorithm is to seek until we find a frame at or above
// SPEECH_TRIGGER, all the while remembering the last frame
// we saw that was less than SILENCE_TRIGGER. The frame
// after the last silence frame marks the start of a
// syllable. We then scan for the first frame that is less
// than SILENCE_TRIGGER, all the while recording local
// minima as syllable boundaries.  We continue until we run
// out of frames.
PRIVATE int findsyll(uns8 *pFrames, int nFrames, int frameSize,
   int *p_wstart, int *p_wend, int maxSyl)
{
#define SILENCE_TRIGGER_OFFSET 12    // 4.5 dB
#define SPEECH_TRIGGER_OFFSET 32     // 6 dB
uns8 silenceTrigger;
uns8 speechTrigger;
uns8 *pFrame;

int i;
    int nSyl = 0;

// first compute the triggers, which are offsets from
//  the smallest frame found
    if(nFrames < 3)
    return 0;
    int smallestAmp = pFrames[0];

// keep track of the biggest amp, because we have to
// make sure that the triggers we calculate are <= the
// biggest amp.  Unfortunately, this code is complicated by
// the fact that we must leave at least one frame at each
// edge (that is, we assume that the edge frames are
// silence).  So, to protect against the bizarre case where
// the edge frames may contain the true largest amp we
// ignore those frames for the biggestAmp calculation.  This
// will insure that we find at least one syllable.
    int biggestAmp = 0;
    for(i = 1, pFrame = pFrames+frameSize; i < nFrames; i++,pFrame+=frameSize) {
    if(pFrame[0] < smallestAmp) {
        smallestAmp = pFrame[0];
    }
    else if( i < nFrames-1 && pFrame[0] > biggestAmp) {
```

- 16 -

```
            biggestAmp = pFrame[0];
        }
    } silenceTrigger = smallestAmp + SILENCE_TRIGGER_OFFSET;
    speechTrigger = smallestAmp + SPEECH_TRIGGER_OFFSET;
    if(silenceTrigger > biggestAmp) {
    silenceTrigger = biggestAmp;
    }
    if(speechTrigger > biggestAmp) {
    speechTrigger = biggestAmp;
    } int thisAmp;
    int lastAmp;
    i = 0;
    pFrame = pFrames;
    FOREVER {
    int lastSil = i;

// scan for start of speech, all the while recording the
    // last frame of silence seen
        while(i < nFrames) {
            thisAmp = (i == 0 || i == nFrames-1) ? 0 :
    pFrame[0];
            if(thisAmp < silenceTrigger)
            lastSil = i;
            else if(thisAmp >= speechTrigger)
            break;
            i++;
            pFrame+=frameSize;
            lastAmp = thisAmp;
        } if(i>=nFrames)
            break;

// mark start of first syllable as frame after last
    // silence seen
        if(nSyl < maxSyl) {
            p_wstart[nSyl] = lastSil+1;
            assert(p_wstart[nSyl] > 0 && p_wstart[nSyl] <
    nFrames-1);
        } i++;
        pFrame+=frameSize;
        lastAmp = thisAmp;
```

- 17 -

```
        // now, seek silence, all the while creating syllable
    // boundaries at all local minima lastDelta records the
    // direction of the last change in amplitude. Since we just
    // hit the first frame of speech, the initial value is
5   // positive (the last delta was in the upward direction).
        int lastDelta = 1;
        while(i < nFrames) { thisAmp = (i == 0 || i == nFrames-1) ? 0 :
    pFrame[0];
10
            // if we have hit silence break out
            if(thisAmp < silenceTrigger)
            break;

// have we changed direction?
15          int thisDelta = thisAmp - lastAmp;

// if yes, check if this is a local minimum
            if(thisDelta != 0) {

// it's a local minimum if the last change we saw
    was
20          // downward and the current change is upward
            if(lastDelta < 0 && thisDelta > 0) {

// record the end of a syllable
                if(nSyl < maxSyl) {
                p_wend[nSyl] = i-1;
25              assert(p_wend[nSyl] > 0 && p_wend[nSyl] <
    nFrames-1);
                assert(p_wstart[nSyl] <= p_wend[nSyl]);
                }

// count one more syllable
30              nSyl++;

// record the start of the new syllable
                if(nSyl < maxSyl) {
                p_wstart[nSyl] = i;
                assert(p_wstart[nSyl] > 0 && p_wstart[nSyl] <
35  nFrames-1);
                }
            }

// remember this change as the last change for next
            // time around
40          lastDelta = thisDelta;
            }
```

- 18 -

```
            // note that if the amplitude is stationary, we
       // don't modify lastDelta; we want lastDelta to record the
       // last change seen.
            i++;
            pFrame+=frameSize;
            lastAmp = thisAmp;
       }

// mark the final ending syllable of this stretch of
       // speech
       if(nSyl < maxSyl) {
            p_wend[nSyl] = i - 1;
            assert(p_wend[nSyl] > 0 && p_wend[nSyl] <
  nFrames-1);
            assert(p_wstart[nSyl] <= p_wend[nSyl]);
       } nSyl++;
       }
       return nSyl;
  }
  const int find_wgts[]={1,4,6,6,4,1};
  PRIVATE int fw_smooth_amp(uns8 *p0,int frame_size,int
  frame_num,int num_frame) {
       int frame,first_frame,last_frame;
       int wgt,wgt_sum,amp_sum;

/* We will take a weighted average of the amplitudes of the
  6 frames
       in a window around the frame of interest, where the frame
  of interest
       is the 4th frame in the window.

Exceptions: if there are fewer than 3 frames to the left
  of the
            frame of interest, chop the window on the left. If
  there
            are fewer than 2 frames on the right, chop the
  right.
  */
       first_frame = frame_num - 3;
       if (first_frame<0) {
            first_frame = 0;
       }
       last_frame = frame_num + 3;
       if (last_frame>num_frame) {
            last_frame = num_frame;
```

- 19 -

```
        }
        wgt_sum = 0;
        amp_sum = 0;
        for (frame=first_frame; frame<last_frame; frame++) {
            wgt = find_wgts[frame-frame_num+3];
            wgt_sum += wgt;
            amp_sum += wgt * *(p0 + frame_size*(frame -
    frame_num) );
        }
        amp_sum += (wgt_sum/2);
        amp_sum = amp_sum / wgt_sum;
        return amp_sum;
    }

// This routine finds "syllables" in an utterance
    PRIVATE int findsyl(uns8 *pFrames, int nFrames, int
    frameSize,
        int *p_wstart, int *p_wend, int maxSyl, int minToFind)
    {
        // compute the smoothed amps
        int i;
        uns8 *pFrame;
        uns8 *pSmoothAmps = NEW_ARRAY(uns8, nFrames);

for(i = 0, pFrame = pFrames; i < nFrames; i++, pFrame +=
    frameSize) {
            pSmoothAmps[i] =
    fw_smooth_amp(pFrame,frameSize,i,nFrames);
        }

// find the syllables
        int nSyl = findsyl1(pSmoothAmps, nFrames, 1, p_wstart,
    p_wend, maxSyl);
        if(nSyl == 0 && maxSyl > 0) {
            assert(nFrames > 2);
            p_wstart[0] = 1;
            p_wend[0] = nFrames-2;
            nSyl = 1;
        }

// now break up the largest until we have the minimum
        // number of syllables we are looking for
        assert(minToFind <= maxSyl);
        if(nSyl < minToFind) {
            while(nSyl < minToFind) {
                int iSyl;
                int iMin;
                int largest = p_wend[0] - p_wstart[0];
```

- 20 -

```
            iSyl = 0;
            for(i = 1; i < nSyl; i++) {
            int thisSize = p_wend[i] - p_wstart[i];
            if(thisSize > largest) {
                largest = thisSize;
                iSyl = i;
            }
            }
            iMin = (p_wstart[iSyl] + p_wend[iSyl]) / 2;
            // breaking up is hard to do
            memmove(p_wstart+iSyl+1, p_wstart+iSyl, (nSyl -
    iSyl)*sizeof(int));
            memmove(p_wend+iSyl+1, p_wend+iSyl, (nSyl -
    iSyl)*sizeof(int));
            p_wend[iSyl] = iMin;
            assert(iMin+1 <= p_wend[iSyl+1]);
            p_wstart[iSyl+1] = iMin+1;
            nSyl++;
        }
    }

DELETE_ARRAY(pSmoothAmps);
    return nSyl;
}

EXTERN SD_REJCODE CSR_GetAlignment(SD_UTT hUtt, int nWords,
                SD_WORD_SPEC *pWords,
                SD_WORD_ALIGNMENT *pAlign);

// the score is the accumulated absolute difference between
// the expected duration in each word and the allocated
// duration
typedef struct {
    int startFrame;
    int startSyl;   // starting syllable of the best path to
this word
    int score;      // score of the best path to this word
    int duration;   // # frames that have been allocated to
this word
} DPWORD;

void allocateSyllables(int *sylStartFrame,  // array of
                                            // syllable starts
                int *sylEndFrame,    // array of syllable
                                     // endings
                int nSyls,
                int *expDurs,    // array of expected
                                 // durations for
                                 // words, in frames
```

- 21 -

```
                    int nWords,
                    int *wordStartSyls   // gets results; that
                                         // is, for each
                                  // word we store the index of the
                                  // starting syllable for that word.
                    )
        {
            DPWORD *words;

if(nWords == 0 || nSyls == 0)
            return;

words = NEW_ARRAY(DPWORD, nWords);
            int **trcBack;

int iWord;
            int iSyl;

trcBack = NEW_ARRAY(int *, nWords);
            for(iWord = 0; iWord < nWords; iWord++) {
            trcBack[iWord] = NEW_ARRAY(int, nSyls);
            } words[0].startSyl = 0;
            words[0].startFrame = sylStartFrame[0];
            words[0].duration = 0;
            for(iSyl = 0; iSyl < nSyls; iSyl++) {
            for(iWord = iSyl < nWords ? iSyl : nWords - 1; iWord >=
    0; iWord--) {
                  if(iWord == 0) {
                  words[iWord].duration =
                      sylEndFrame[iSyl] - words[iWord].startFrame + 1;
                  words[iWord].score =
                      ABS(words[iWord].duration - expDurs[iWord]);
                  }
                  else if(iWord == iSyl) {
                  // seed new
                  words[iWord].startSyl = iSyl;
                  words[iWord].startFrame = sylStartFrame[iSyl];
                  words[iWord].duration =
                      sylEndFrame[iSyl] - words[iWord].startFrame + 1;
                  words[iWord].score =
                      words[iWord-1].score +
                      ABS(words[iWord].duration - expDurs[iWord]);
                  }
                  else {
                  int scoreStay;
                  int scoreReseed;
                  // compute score if we stay in this word
```

- 22 -

```
            scoreStay = words[iWord].score -
                ABS(words[iWord].duration - expDurs[iWord])
                + ABS(sylEndFrame[iSyl] -
        words[iWord].startFrame + 1
                - expDurs[iWord]);
            // compute score if we reseed from previous word
            scoreReseed = words[iWord-1].score +
                ABS(sylEndFrame[iSyl] - sylStartFrame[iSyl] + 1
                - expDurs[iWord]);
            if(scoreStay < scoreReseed) {
                words[iWord].score = scoreStay;
                words[iWord].duration =
                    sylEndFrame[iSyl] - words[iWord].startFrame + 1;
            }
            else {
                words[iWord].startSyl = iSyl;
                words[iWord].startFrame = sylStartFrame[iSyl];
                words[iWord].duration =
                    sylEndFrame[iSyl] - words[iWord].startFrame
        + 1;
                words[iWord].score = scoreReseed;
            }
        }
            trcBack[iWord][iSyl] = words[iWord].startSyl;
        }
    }

// transfer results to wordStartSyls
    iWord = nWords-1;
    wordStartSyls[iWord] = trcBack[iWord][nSyls-1];
    iWord--;
    for( ; iWord >= 0; iWord--) {
        wordStartSyls[iWord] =
    trcBack[iWord][wordStartSyls[iWord+1]-1];
    } for(iWord = 0; iWord < nWords; iWord++) {
    DELETE_ARRAY(trcBack[iWord]);
    }
    DELETE_ARRAY(trcBack);
    DELETE_ARRAY(words);
}

PRIVATE SD_REJCODE getAlignmentWithNoModels(SD_UTT hUtt, int
nWords,
                        SD_WORD_SPEC *pWordSpecs,
                        SD_WORD_ALIGNMENT *pAlign)
{
```

- 23 -

```
        int maxSyl; // number of entries allocated in
    sylStartFrame & sylEndFrame
        int *sylStartFrame; // syllable start frames
        int *sylEndFrame;   // syllable end frames
        int nSyl;
        int i;
        TKN_HANDLE token = sdUttGetToken(hUtt);
        uns16 nFrames;
        uns16 bytesPerFrame;

sin_start(token, 0);

uns8 *pFrames = tkn_pfrms(token, &nFrames,
    &bytesPerFrame);
        if(nFrames < 5) {
            return REJ_UTT_TOO_SHORT;
        }

UINT msecPerFrame =
    SP_GetFrameRate(tok_getTargetSigCode(token));

MEMSTK_MARK memStk= MemStk_Mark();
        maxSyl = 100;
        FOREVER {
        sylStartFrame = MemStk_NEW_ARRAY(int, maxSyl);
        sylEndFrame = MemStk_NEW_ARRAY(int, maxSyl);
        // find the syllables in the utterance, where we must
    // find at least nWords of them.
        nSyl = findsyl(pFrames, nFrames, bytesPerFrame,
                    sylStartFrame, sylEndFrame, maxSyl, nWords);
        // if there are more syllables than we allocated space
    // for, realloc with needed size
        if(nSyl > maxSyl) {
            MemStk_DELETE_ARRAY(sylEndFrame, int, maxSyl);
            MemStk_DELETE_ARRAY(sylStartFrame, int, maxSyl);
            maxSyl = nSyl;
            continue;
        }
        break;
        }

// get the lengths of each word for calculating the
    // expected duration
        assert(nWords > 0);
        int totExpDur = 0;
        int *expDurs;
        expDurs = MemStk_NEW_ARRAY(int, nWords);
        for(i = 0; i < nWords; i++) {
```

- 24 -

```
            expDurs[i] = sdWordGetName(pWordSpecs[i].hVoc,
    pWordSpecs[i].hWord, 0, 0);
            totExpDur += expDurs[i];
        }

5       // calculate the total duration in all of the syllables
        int durToAllocate = 0;
        for(i = 0; i < nSyl; i++) {
        durToAllocate += sylEndFrame[i] - sylStartFrame[i] + 1;
        }

10      // we assume that the duration of each word is
        // proportional to the length of its name.  Use dynamic
        // programming to find the allocation of syllables to words
        // which gives the best fit of allocated duration with
        // expected duration.
15          for(i = 0; i < nWords; i++) {
            // calculate the expected duration for this word
            expDurs[i] =
    (expDurs[i]*durToAllocate+(totExpDur/2))/totExpDur;
            }

20          int *wordStartSyls = MemStk_NEW_ARRAY(int, nWords);
            allocateSyllables(sylStartFrame, sylEndFrame, nSyl,
                    expDurs, nWords, wordStartSyls);
            for(i = 0; i < nWords; i++) {
            int endFrame;
25          pAlign[i].startTime = sylStartFrame[wordStartSyls[i]] *
    msecPerFrame;
            endFrame = (i == nWords - 1) ?
                sylEndFrame[nSyl-1] : sylEndFrame[wordStartSyls[i+1]
    - 1];
30          pAlign[i].duration =
                (endFrame - sylStartFrame[wordStartSyls[i]] + 1) *
    msecPerFrame;
            }
            MemStk_Release(memStk);
35          return 0;
    }

PRIVATE SD_REJCODE getAlignmentWithModels(SD_UTT hUtt, int
    nWords,
                        SD_WORD_SPEC *pWordSpecs,
40                      SD_WORD_ALIGNMENT *pAlign)
    {
        SD_REJCODE rejCode;
        uint i;
        BOOL success;
```

- 25 -

```
        rejCode = CSR_GetAlignment(hUtt, nWords, pWordSpecs,
    pAlign);

if(rejCode == 0) {
        success = YES;
5       // if any durations are 0, then we failed
        for(i = 0; i < nWords; i++) {
            if(pAlign[i].duration == 0) {
            success = NO;
            break;
10          }
        }
        if(!success) {
            // have to kludge it
            rejCode = getAlignmentWithNoModels(hUtt, nWords,
15      pWordSpecs, pAlign);
        }
        } return rejCode;
    }

20  // Returns YES if successful.  Builds a DP model starting at
    // a specific time and extending for a specific duration.
    // You should be passing the estimated startTime & duration
    // of the actual word, NOT including silence.  In other
    // words, we are not going to call findword, rather, we are
25  // going to calculate the start frame from startTime and the
    // end frame from startTime + duration minus 1 frame.
    PUBLIC BOOL sdAlignBuildModel(SD_VOC hVoc, SD_WORD hWord,
    SD_UTT hUtt,
                    int32 startTime, int32 duration)
30  {
        volatile SD_UTT hUttTemp;
        SD_UTT_INFO uttInfo;
        sdUttGetInfo(hUtt, &uttInfo);
        UINT msecPerFrame =
35
    SP_GetFrameRate(tok_getTargetSigCode(sdUttGetToken(hUtt)));

assert(startTime < uttInfo.duration);
        // there must be at least one frame of silence at the
    edges
40      assert(startTime >= msecPerFrame);
        assert(startTime + duration <=
    uttInfo.duration-msecPerFrame);

MEMSTK_MARK memStk= MemStk_Mark();
```

- 26 -

```
        hUttTemp = 0;

if(ErrTrap()) {
        sdUttDelete(hUttTemp);
 5      ErrContinue();
        }

// first exise the portion for which we want a model
        hUttTemp = sdUttCloneAsSmaller(hUtt, startTime,
   duration);

10      // now prepend the starting silence and append the
        // ending silence. Use just a single frame of silence from
        // the edges of the original utterance
        assert(uttInfo.duration >= msecPerFrame);
        SD_UTT hUttx;
15      SD_UTT hUtt1;

// first the start frame
        hUtt1 = sdUttCloneAsSmaller(hUtt, 0, msecPerFrame);
        hUttx = hUttTemp;
        hUttTemp = sdUttMerge(hUtt1, hUttTemp);
20      sdUttDelete(hUttx);
        sdUttDelete(hUtt1);

// now the end frame
        hUtt1 = sdUttCloneAsSmaller(hUtt, uttInfo.duration -
25   msecPerFrame,
                            msecPerFrame);
        hUttx = hUttTemp;
        hUttTemp = sdUttMerge(hUttTemp, hUtt1);
        sdUttDelete(hUttx);
30      sdUttDelete(hUtt1);

SD_REJCODE rejCode;
        TRAIN_STATUS trainStatus;
        TRAIN_PARAMETERS trainPar;
        trainPar.weight = 0;
35      trainPar.tolerance = 3;
        char *name;
        size_t szName = 100;
        name = (char *)MemStk_Alloc(szName);

// get the word name
40      FOREVER {
        size_t szNeed;
        szNeed = sdWordGetName(hVoc, hWord, name, szName);
        if(szNeed > szName) {
            MemStk_Free(szName);
```

- 27 -

```
            szName = szNeed;
            name = (char *)MemStk_Alloc(szName);
            continue;
        }
        break;
    } sdWordTrain(hVoc,
        1, (const char *)name,
        1, (SD_UTT *)&hUttTemp,
        &trainPar, &trainStatus, &rejCode,
        1, /* startFrm */
        duration/msecPerFrame /* endFrm */);

ErrPop();
    sdUttDelete(hUttTemp);

MemStk_Release(memStk);
    return trainStatus.nGood > 0;
}

PRIVATE void deleteTempModel(SD_USER hUser, WM_ID userId)
{
    assert(hUser);

if(userId == 0) {
    return;
    } sdUserDeleteId(hUser, userId);
}

/***
    void SDWord_GetAlignment(SD_UTT hUtt, int32 startTime,
            int nWords, SD_WORD_SPEC *pWordSpecs,
            SD_WORD_ALIGNMENT *pAlign)

ARGUMENTS
    hUtt       Utterance handle
    startTime  In milliseconds relative to the start of the
  utterance.
    nWords     Number of words in pWordSpecs array
    pWordSpecs Array of words
    pAlign     Gets the resulting alignment

ERROR MESSAGES

FUNCTION DESCRIPTION
```

- 28 -

```
        This routine will find the best alignment of the
   sequence of words with
        the given utterance, starting at startTime relative to
   the start of the
5       utterance.  That is, it will tell you where each word
   starts
        within the utterance, and how long each word is.

***/
   PUBLIC SD_REJCODE sdWordGetAlignment(SD_UTT hUtt,
10                    int32 startTime,
                      int nWords,
                      SD_WORD_SPEC *pWordSpecs,
                      SD_WORD_ALIGNMENT *pAlign)
   {
15     volatile SD_UTT hUttTemp;

MEMSTK_MARK memStk= MemStk_Mark();

SD_REJCODE rejCode = 0;

20     int i;

// in case of error...
       for(i= 0; i<nWords; i++) {
       pAlign[i].startTime= 0;
       pAlign[i].duration= 0;
25     }

// don't support cross voc yet
       for(i= 1; i<nWords; i++) {
       if(pWordSpecs[i].hVoc != pWordSpecs[0].hVoc)
           // FUTURE fix this
30         ErrError(__FILE__, __LINE__,
               "Don't support cross-vocabulary alignment");
       }

// collect the utterance
       sdUttCollect(hUtt);

35     // reject if the specified startTime is out of bounds
       SD_UTT_INFO uttInfo;
       sdUttGetInfo(hUtt, &uttInfo);
       if(startTime >= uttInfo.duration) {
       MemStk_Release(memStk);
40     return REJ_UTT_TOO_SHORT;
       }
```

- 29 -

```
        // if caller specifies a specific startTime, we satisfy
     // this by the hack of creating a temporary new utterance
     // which is the old one but cloned as smaller
        hUttTemp = hUtt;
 5      if(startTime != 0) {
        hUttTemp = sdUttCloneAsSmaller(hUtt, startTime, 0x7fff);
        if(ErrTrap()) {
            sdUttDelete(hUttTemp);
            ErrContinue();
10      }
        } uint numWithNoModel;
        BOOL *hasModel; // keep track of which words have models
     here
15      hasModel = MemStk_NEW_ARRAY(BOOL, nWords);

// find all words without models
        numWithNoModel = 0;
        for(i = 0; i < nWords; i++) {
        hasModel[i] = sdWordHasModel(pWordSpecs[i].hVoc,
20   pWordSpecs[i].hWord);
        if(!hasModel[i]) {
            numWithNoModel++;
        }
        }

25      if(numWithNoModel == 0) {
        rejCode = getAlignmentWithModels(hUttTemp, nWords,
     pWordSpecs, pAlign);
        }
        else {
30   #define MAX_PASSES 6
        uint iPass;

SD_USER hUser = sdUserGetCurrent();
        WM_ID *userIds = MemStk_NEW_ARRAY(WM_ID, nWords);

SD_WORD_ALIGNMENT *pNewAlign =
35   MemStk_NEW_ARRAY(SD_WORD_ALIGNMENT,
                                    nWords);

// get the alignment with no models
        rejCode = getAlignmentWithNoModels(hUttTemp, nWords,
     pWordSpecs, pAlign);

40      if(rejCode != 0) {
            goto done;
        }
```

- 30 -

```
    for(iPass = MAX_PASSES; iPass > 0; iPass--) {
// build temporary models for the words with no models
    for(i = 0; i < nWords; i++) {
        if(!hasModel[i]) {

// build the model
            BOOL success =
sdAlignBuildModel(pWordSpecs[i].hVoc,
                    pWordSpecs[i].hWord,
                    hUttTemp,
                    pAlign[i].startTime,
                    pAlign[i].duration);

userIds[i] =
sdUserVocId2UserId(sdUserVocLink(hUser,
                    pWordSpecs[i].hVoc),
                    pWordSpecs[i].hWord);
            // if the build failed clean up and get out.  We
            // will return the alignment that we currently
            // have
            if(userIds[i] == 0 || !success) {
            int j;
            for(j = 0; j <= i; j++) {
                if(!hasModel[j]) {
                deleteTempModel(hUser, userIds[j]);
                }
            }
            goto done;
            }
        }
    }

// get the alignment with these models
    rejCode = getAlignmentWithModels(hUttTemp, nWords,
                    pWordSpecs, pNewAlign);

// delete temporary models
    for(i = 0; i < nWords; i++) {
        if(!hasModel[i]) {
            deleteTempModel(hUser, userIds[i]);
        }
    } if(rejCode != 0) {
    break;
    }
```

- 31 -

```
        // if new alignment == old alignment then we are done
            for(i = 0; i < nWords; i++) {
            if(pNewAlign[i].startTime != pAlign[i].startTime
               ||
                pNewAlign[i].duration != pAlign[i].duration) {
              break;
            }
            }
            if(i >= nWords) {
            break;
            }

// old alignment = new alignment;
            for(i = 0; i < nWords; i++) {
            pAlign[i] = pNewAlign[i];
            }
        }
        } done:
        if(startTime != 0) {
        ErrPop();
        sdUttDelete(hUttTemp);
        if(rejCode == 0) {
            for(i= 0; i<nWords; i++) {
            pAlign[i].startTime += startTime;
            }
        }
        }
        MemStk_Release(memStk);
        return rejCode;
    }
```

What is claimed is:

1. A method for dynamically adding new words to a speech recognition system vocabulary during continuous speech dictation, comprising:

determining whether a multi-word user utterance contains one or more new words not in the speech recognition system vocabulary;

extracting speech frames from the multi-word user utterance that correspond to the one or more new words not in the speech recognition system vocabulary; and building speech models for each of the one or more new words using the extracted speech frames.

2. The method of claim 1 further comprising:

saving of the speech models in the speech recognition system vocabulary.

3. The method of claim 2 further comprising:

before the extracting step, providing a correct spelling of each of the one or more new words, wherein the saving step includes saving the correct spelling of each of the one or more new words in the speech recognition system vocabulary.

4. The method of claim 1 wherein the extracting step is an iterative process including:

aligning speech frames of the multi-word user utterance against speech elements of the multi-word user utterance;

building new speech models for the one or more new words in accordance with the alignment;

re-aligning the speech frames of the multi-word user utterance using the new speech models;

comparing the re-alignment to the alignment; and if the re-alignment and the alignment are not the same, repeating the building step, in accordance with the re-alignment, and the re-aligning and comparing steps until the re-alignment and the previous alignment are the same or for a predetermined number of times.

5. The method of claim 4, wherein the speech elements comprise syllable approximations.

6. The method of claim 5, wherein the aligning step further comprises:

assigning the syllable approximations to words in proportion to a length of each word.

7. The method of claim 6 wherein the length of each word comprises the number of letters in the word.

8. The method of claim 6 wherein the length of each word comprises the number of vowels in the word.

9. The method of claim 5 wherein determining syllable approximations includes:

determining syllable boundaries including:

detecting a first speech boundary speech frame in the multi-word user utterance as the first speech boundary speech frame having an amplitude that exceeds a speech trigger;

detecting a first silence boundary speech frame as the first speech frame, prior to the first speech boundary speech frame, to have an amplitude that exceeds a silence trigger, wherein the first silence boundary speech frame comprises a first syllable boundary;

detecting a second silence boundary speech frame as the first speech frame, after the first speech boundary speech frame, to have an amplitude that falls below the silence trigger; and detecting local minima between the first and second silence boundary speech frames, wherein the local minima and second silence boundary speech frames comprise next syllable boundaries.

10. The method of claim 9 wherein determining syllable boundaries further includes:

repeating the steps of claim 10 until each speech frame in the multi-word user utterance has been considered.

11. The method of claim 10 further including:

determining whether the number of syllable approximations is less than the number of words in the multi-word user utterance; and if so, dividing a syllable approximation corresponding to a largest number of speech frames into multiple syllable approximations.

12. The method of claim 11 further including:

repeating the steps of claim 12 until the number of syllable approximations is greater than or equal to the number of words in the multi-word user utterance.

13. The method of claim 4, wherein the aligning step comprises:

prompting the user for discrete utterances of each of the one or more new words;

building new speech models for the one or more new words using the discrete utterances; and aligning the speech frames of the multi-word user utterance using the new speech models.

* * * * *